Nov. 19, 1935.  D. H. GREENWOOD  2,021,358
LUBRICATED STOPCOCK
Filed March 17, 1931
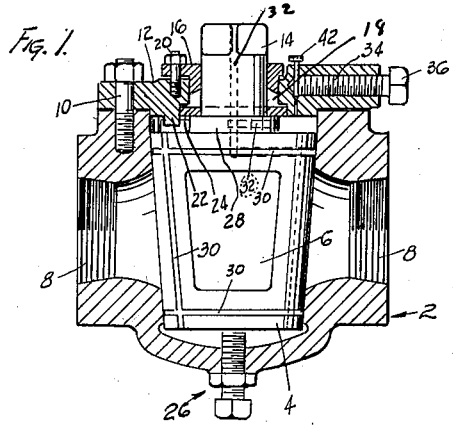
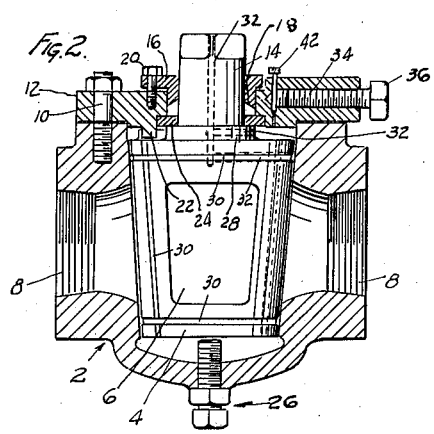
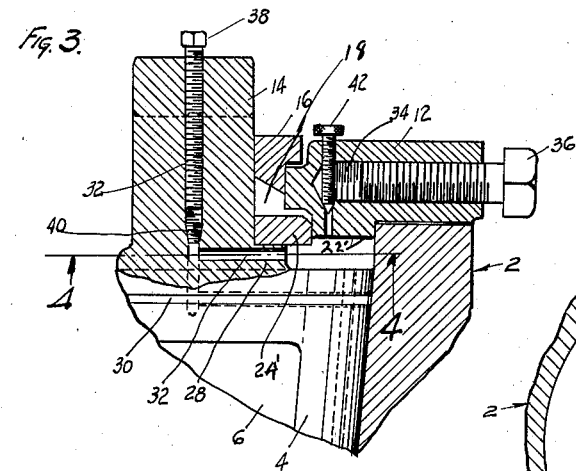
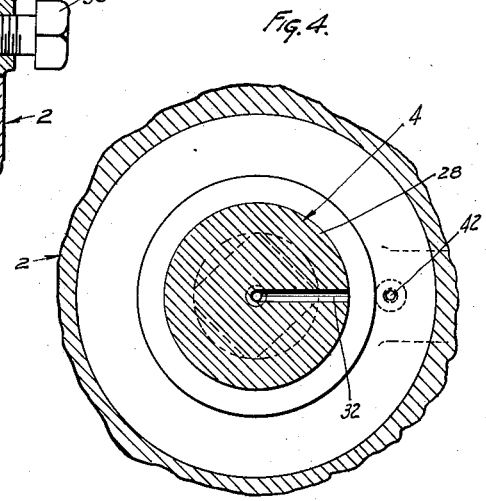
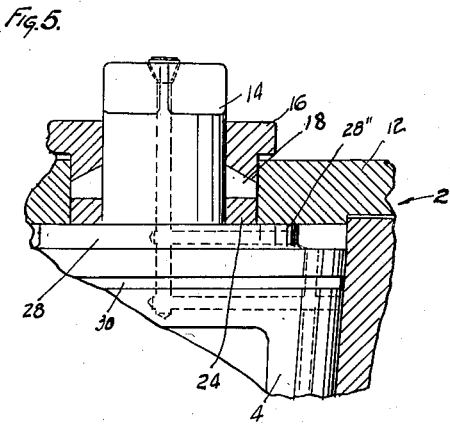
INVENTOR.
D. H. GREENWOOD.
BY
ATTORNEY Patented Nov. 19, 1935

2,021,358

UNITED STATES PATENT OFFICE 2,021,358

LUBRICATED STOPCOCK

Dolphice H. Greenwood, Los Angeles, Calif.

Application March 17, 1931, Serial No. 523,259

3 Claims. (Cl. 251—93)

My invention relates to valve constructions, and more particularly to lubricated valve cocks, in which it is possible to remove the packings and packing gland, irrespective of the position of the valve plug or pressure conditions in the pipe line or said construction.

It accordingly is an object of my invention to provide a novel valve construction in which a suitable cap is provided with means adapted to coact with a valve plug in said construction, which means, when said plug is moved by a suitable plug moving means, will hold said plug in such a position so that the valve packing means, such as a packing gland, and a packing ring, may be removed and replaced without disturbing the pressure conditions in said construction.

It is also within the province of my invention to provide a novel form of lubricated cock having means associated therewith whereby a suitable lubricant may be introduced therein in a plurality of ways, means being also provided for shutting off the lubricant passages to said cock so another lubricant supply may be introduced.

The above and further objects and advantages of my invention, as will hereinafter more fully appear, I attain by the construction described in the specification, and illustrated in its preferred form on the drawing, forming a part of my application.

Reference is had to the accompanying drawing, in which similar reference characters denote similar parts. In the drawing, Fig. 1 is a cross-sectional view of one form of my invention, illustrating the position of the valve plug in operative position, Fig. 2 is a similar view but illustrating the position the plug assumes when it is desired to remove the packings, Fig. 3 is an enlarged fragmentary cross-sectional view of the form shown in Figs. 1 and 2, but showing a slightly modified form of packing ring and abutment, Fig. 4 is a cross-sectional view, taken on the line 4—4, Fig. 3, and Fig. 5 is a view similar to Fig. 3, but showing a modified form of valve cap and valve plug.

Describing my invention more in detail, in its broader aspects said invention comprises a novel form of valve construction in which it is possible to lift the valve plug associated with said construction whereby an effective seal will be provided so the valve packing associated with said construction may be removed and replaced, irrespective of the open or closed position of said plug or the pressure conditions in said construction.

I also contemplate the provision of a novel valve construction for introducing a suitable lubricant to the valve plug therein in a plurality of ways, means being also provided whereby the lubricant passages may be shut off so an additional supply of lubricant may be introduced into said construction.

More specifically, my invention comprises a valve construction 2 of any preferred form having associated therewith a valve plug 4 of suitable character having a through passage way 6 adapted to permit the passage of the fluid in the pressure line to pass therethrough, the threaded connections 8 functioning to detachably connect said construction to said pressure line.

Associated in any desired way with the construction 2, as by screw bolts 10, is a valve cap 12 having an opening to receive the valve stem 14, which is surrounded by a suitable packing gland 16, having a packing 18 and screw bolts 20.

If desired the valve cap 12 may be cut-away to provide a suitable abutment 22, as seen in Figs. 1 and 2, or a slightly modified abutment 22', as seen in Fig. 3, any preferred form of packing ring 24, constructed of suitable material, as shown in Figs. 1 and 2 or the packing ring 24', shown in Fig. 3, said rings being adapted to coact with said abutments to seal off the line pressure in the manner presently to be described, so the packing gland 16 and packing 18 may be removed and replaced, irrespective of the open or closed position of the valve plug 4 or the pressure conditions in the valve construction 2.

To lift or move the valve plug from the operative position shown in Fig. 1 to the sealing position depicted in Fig. 2, any preferred means, such as the screw bolt and nut locking means 26 may be provided. By thus lifting the plug 4 the boss 28 on said plug will engage the packing rings 24 or 24' to hold them against the valve cap abutments 22 and 22' so the gland 16 may be removed, and the packing 18 replaced, or a new gland provided, without shutting down the line pressure.

In Fig. 5 I have shown a modified form of boss 28 which has an extension 28" to engage the cap 12, the packing ring 24 being of smaller diameter than those shown in Figs. 1–3 inclusive, and moving in the opening in the cap 12, below the packing 18, the abutments 22 and 22' being omitted in this form of my invention.

Both ends and the lateral surface of the plug 4 are continually lubricated, said lateral surface being provided with suitable intersecting through grooves 30 for this purpose, said grooves permitting the lubricant to move from the space above to the space below said plug so both ends as well as the side of said plug will be continually lubricated and said plug practically float in the valve construction 2.

The lubricant, which may be in any preferred form, may be introduced into the valve construction 2 in a plurality of ways, either through the passages 32 in the valve stem 14, or through a passage 34, controlled in any suitable way as by the reloading screw 36.

The stem 14 may be provided with a suitable lubricant reloading or controlling screw 38 in the passage 32, in which may be placed a suitable check valve, such as the ball valve 40.

Moreover, if desired, a suitable valve, such as the needle valve 42, may be provided to close off the lubricant passage to the top of plug 4 so the passage 34 may be reloaded with lubricant at will.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

I claim as my invention:

1. In a valve construction, a cap therefor, a valve plug in said construction, a packing gland associated with said construction, a packing ring associated with said gland and said plug, an abutment on said cap, and means distinct and separate from said plug for moving said plug so said packing ring will engage said abutment whereby said packing gland may be removed irrespective of the open or closed position of said plug.

2. In a valve construction, a casing, a valve plug operable in said casing, said casing being provided with a compartment at each end of said plug, and a valve stem for operating said valve plug, the convex surface of said plug being provided with inter-communicating lubricating channels communicating with said compartments, and said stem provided with a longitudinal lubricating passage, and a plurality of lateral passages, connecting therewith, at least one of said lateral passages communicating with one of said compartments, while at least another communicates with the external surface of said plug to lubricate said inter-communicating channels in the convex surface of said plug.

3. In a stop cock, a casing, a cap for said casing, a valve plug operable in said casing, a stem for said plug, a packing gland surrounding said stem, means for adjusting said gland with respect to said cap, said cap being provided with a cut-out portion on the inner side thereof, a packing ring surrounding said stem and adapted to be moved in said cut-out portion, and means, distinct and separate from said plug, whereby said plug may be moved to move said ring in said cut-out portion to lock said plug so said packing may be replaced without shutting off the fluid pressure in the line with which said cock is adapted to be associated.

DOLPHICE H. GREENWOOD.